(No Model.)
P. KIEFER.
DEVICE FOR USE IN BINDING GRAIN SHOCKS.
No. 504,592. Patented Sept. 5, 1893.
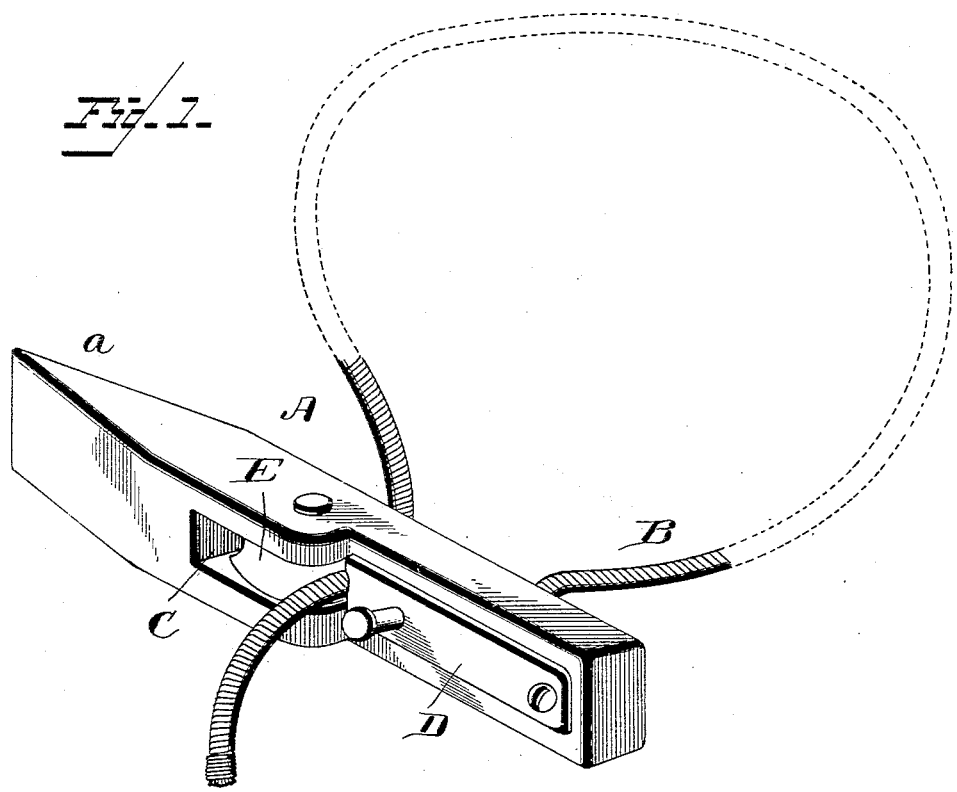
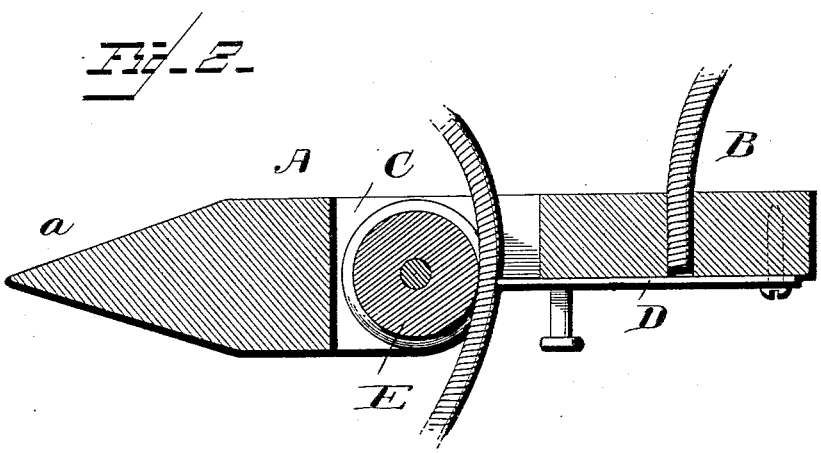

UNITED STATES PATENT OFFICE.

PETER KIEFER, OF BELLE FOUNTAIN, WISCONSIN.

DEVICE FOR USE IN BINDING GRAIN-SHOCKS.

SPECIFICATION forming part of Letters Patent No. 504,592, dated September 5, 1893.

Application filed April 1, 1893. Serial No. 468,721. (No model.)

*To all whom it may concern:*

Be it known that I, PETER KIEFER, a citizen of the United States, residing at Belle Fountain, in the county of Columbia and State of Wisconsin, have invented certain new and useful Improvements in Devices for Use in Binding Grain-Shocks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to, means for binding shock of corn, and to provide a device for this purpose that will be simple in structure and efficient and convenient in use.

More especially my device belongs to the class by which the shock is temporarily bound to enable its easy and ready permanent binding.

To the ends indicated my invention consists in the shock binding implement having the construction and combination of parts hereinafter specified and illustrated in the annexed drawings, in which—

Figure 1 is a perspective view, and Fig. 2 a horizontal section.

Referring to the drawings by letter, A designates a bar having a wedge-shaped or pointed end *a*, and of such size as to be readily taken in the hand. Near its blunt end, the bar has firmly attached to it a rope B of sufficient length to go around a shock of ordinary size, and have its free end passed through a horizontal opening C at the longitudinal center of the bar.

On the side of the bar at which the free end of the rope emerges, is a spring plate D pivoted so as to be capable of being swung vertically, and adapted when in a horizontal position to bite into or impinge at its free end on the portion of the rope coming through the opening C, so as to prevent its withdrawal. Preferably a wheel or pulley E, is placed in the opening C over which the rope passes, and against which it is pressed by the impinging end of the spring plate D.

The use of my device is as follows: The bar is inserted at its sharp end into the shock to be bound, and then the free end of the rope is carried around the shock and back to the bar, which is then withdrawn to enable said free end to be passed through the opening C, the latter having been uncovered by swinging the plate D to one side. After the rope is passed through the opening, the plate D is moved into position to impinge upon it and then the rope is drawn through the opening to tighten it upon the shock. The rope, it will be seen, is held at the position to which it may be left by the spring plate D. The shock is now in condition to be easily and conveniently bound permanently after which my implement may be removed for use on another shock simply by swinging the plate D to one side, to free the rope, and permit its withdrawal from the opening.

Having thus described my invention, what I claim to be new, and desire to secure by Letters Patent, is—

The improved shock binder described, consisting of a bar having a wedge shaped end, and a longitudinal opening, a pulley journaled in said opening, a rope fixed at one end, with its other end passed over said pulley, and a spring plate pivoted at one end to said bar, arranged parallel therewith and covering the fixed end of the rope, and its other end extended partially over the opening in the bar to bear directly upon the rope, substantially as described.

In testimony whereof I affix my signature in presence of two witnesses.

PETER KIEFER.

Witnesses:
LEON COLBURN,
MARK DALTON.